H. M. R. DAM.
SCALE.
APPLICATION FILED FEB. 25, 1919.

1,332,430.

Patented Mar. 2, 1920.
2 SHEETS—SHEET 1.

INVENTOR
Henry M. Rosendal Dam
BY
Ivan E. O. Konigsberg
ATTORNEY

H. M. R. DAM.
SCALE.
APPLICATION FILED FEB. 25, 1919.

1,332,430.

Patented Mar. 2, 1920.
2 SHEETS—SHEET 2.

Henry M. Rosendal Dam
INVENTOR

BY
Ivan E. C. Konigsberg
ATTORNEY

UNITED STATES PATENT OFFICE.

HENRY M. ROSENDAL DAM, OF BROOKLYN, NEW YORK, ASSIGNOR TO FRANCO ELECTRIC CORPORATION, A CORPORATION OF NEW YORK.

SCALE.

1,332,430.  Specification of Letters Patent.  Patented Mar. 2, 1920.

Application filed February 25, 1919. Serial No. 279,142.

*To all whom it may concern:*

Be it known that I, HENRY M. ROSENDAL DAM a citizen of the Danish Monarchy, residing at Brooklyn, Kings county, New York, have invented a new and useful Improvement in Scales, of which the following is a specification.

This invention relates to scales. The object of the invention is to provide a scale with means for indicating both the individual weighings as well as the total of weighing operation at any time. One object of the invention is to provide a scale of simple, practical construction and design. Another object of the invention is to provide a scale with two hands or indicators, one of which indicate the weight for a single weighing, while the other indicator will serve as a totalizer and indicate the sum total of all preceding weighings in a given series of operations.

With the above and other objects in view my invention comprises such parts, elements and arrangements of parts as are hereinafter set forth, while reference is had to the accompanying drawings, in which—

Figure 1:
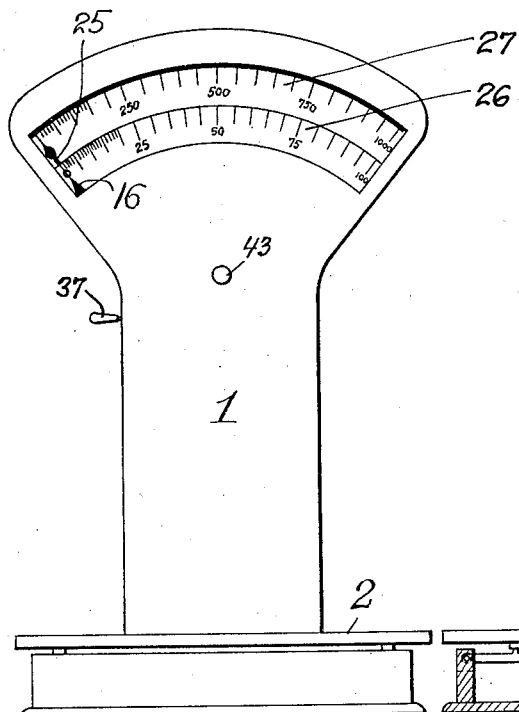
Figure 1 is a front elevation of a scale embodying my invention.
Figure 2:
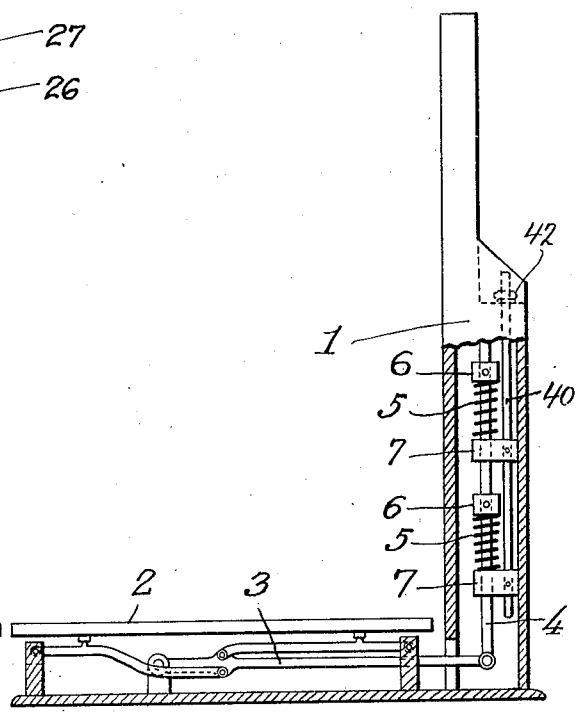
Fig. 2 is a side view with parts in section and broken away.

Referring to the drawing, the numeral 1 denotes a suitable casing which incloses the several parts of the scale mechanism and in which said parts may be suitably mounted and supported. 2 is the platform. The scale beam is generally indicated at 3. To the end of the beam is pivoted the vertical rod 4 which counterbalances the platform by means of springs 5, 5 which act between collars 6, 6 on said rod and collars 7, 7 fixed to the tare adjusting rod 40.

Figure 3:
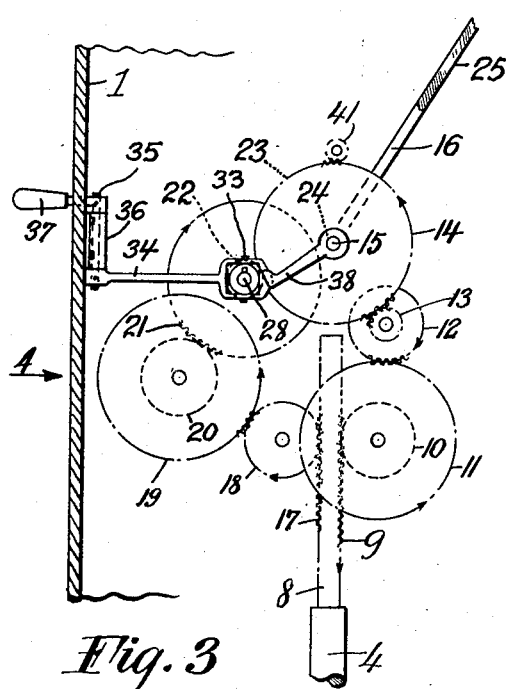
Fig. 3 is a view in elevation of the mechanism for transmitting the movement of the scale to the indicating hands and looking in the direction of arrow 3 in Fig. 4.
Figure 4:
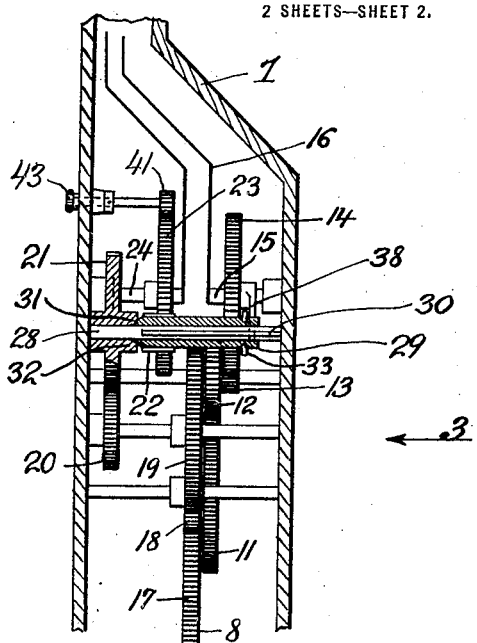
Fig. 4 is a view in section of the parts shown in Fig. 3 looking in the direction of arrow 4 in Fig. 3.
Figure 5:
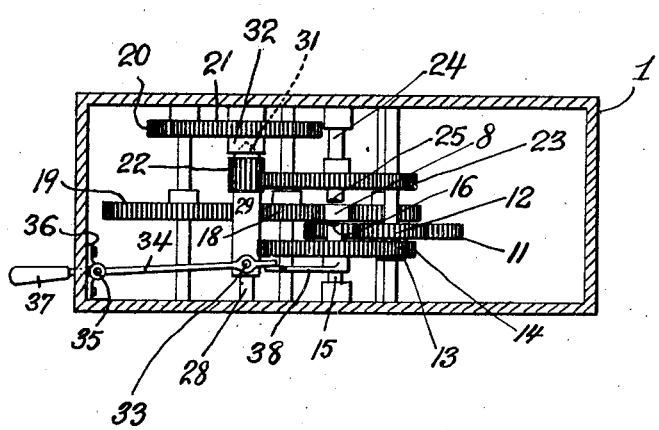
Fig. 5 is a sectional plan view.

Referring now to Figs. 3, 4 and 5, the numeral 8 indicates a rack carried by said rod 4. The rack 8 is provided with the teeth 9 whereby the movements of the rod 4 are transmitted through a train of gears 10, 11, 12, 13 and 14 to a shaft 15 which carries the individual indicator or hand 16. The ratio of movement between gear 10 (the rack 9) and the gear 14 is twenty to one, though any other ratio may be used.

The rack 8 is also provided with teeth 17, whereby the movements of the rod are transmitted through a train of gears 18, 19, 20, 21, 22 and 23 to a shaft 24 which carries the adding or totalizing indicator 25. The shafts 15 and 24 coincide axially. The arrangements of the gears are such that each movement of the totalizer indicator 25 is one tenth of the corresponding movement of the individual indicator 16, but any other ratio may of course, be used.

From the foregoing, it will be understood that when a weight is placed on the platform 2, the rod 4 will move down together with the rack 8 and through the two trains of gears just described, the indicators will indicate the correct weight of the weight on the platform, said correct weight being read on indicating scales 26 and 27 for the hands 16 and 25 respectively.

After each weighing, the hand 16 is of course returned to zero, but the hand 25 is caused to remain in indicating position so that subsequent weighings may be added in order that the hand 25 may show the total. To this end the following means are provided. The gears 21 and 22 are carried by the same shaft 28, but the gear 21 is loose on the shaft while the gear 22 is in driving connection with the shaft through a sleeve 29 and key 30. The sleeve 30 carries a male clutch member 31 and the gear 22 carries a female clutch member 32, or vice versa, if desired. Means are arranged so that the clutch may be thrown out manually and thrown in automatically at the beginning of each weighing operation.

The clutch sleeve 29 is provided with an annular groove which is engaged by pins 33 secured to the clutch lever 34 pivoted at 35 on a bracket 36. A handle 37 is also secured to pivot 35. On the shaft 15 is secured a cam 38.

At the beginning of a weighing operation the parts are in the position shown in Fig. 4, and consequently both indexes, when weighing is done, will show the correct weight, the clutch being in. When the weighing is completed and before the article is removed from the platform, the operator takes hold of handle 37 and throws out the clutch, consequently the totalizer index remains in indicated position, while when the weighed article is removed, the individual index returns to zero. On the return movement of the shaft 15 the cam 38 moves into the path of the clutch lever 34 and at the end of the movement throws the clutch in at the moment the hand 16 is at zero. Consequently at the next operation, both indexes move together again and when they stop, the index 25 will indicate the total of the two weighings. The clutch is again thrown out, the hand 16 returns to zero and so on. At the end of any given number of operations, the index 25 will show the total amount weighed. Thereafter the index 16 returns to zero and the index 25 moves backward a corresponding distance. By operating the gear 41 by the knob 43 the index 25 is returned to zero also, the clutch being disengaged as will be understood.

Figure 6:
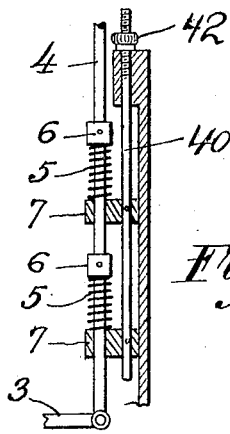
Fig. 6 is a sectional detail view of the tare adjusting means.

Means are provided for eliminating from indication the weight of the tare or container. By referring to Fig. 6, it will be seen that the tare adjusting rod 40 is threaded at 42 and provided with a lock nut 43. When the tare has been placed on the platform the rod 4 moves down thereby compressing the springs 5 against collars 7 which are immovable with rod 40, the latter being locked against the frame by the lock nut 42. Thereafter the lock nut is operated to lift the rod 40 with the collars 7 and through the springs 5 the rod 4 is lifted back into zero position.

The mechanical construction and arrangement of the scale may, of course, be altered to obtain the result indicated and I do not intend limiting myself except as the scope of the appended claims require.

I claim.

1. The combination of a reciprocating member adapted to be operated in conjunction with a scale, two indexes, mechanism for simultaneously operating them to indicate the movement of said reciprocating member in one direction, means for disconnecting the operating elements in said mechanism for the one index from the said mechanism to maintain said one index in indicating position and means for again connecting the operating elements for the said one index with the said mechanism when the reciprocating member has returned to initial position.

2. The combination of a reciprocating member adapted to be operated in conjunction with a scale, two indexes, mechanism for simultaneously operating them to indicate the movement of said reciprocating member in one direction, manually operated means for disconnecting the actuating element in said mechanism for the said one index from the said mechanism to maintain said one index in indicating position and automatic means controlled by said actuating element for again connecting the operating elements for the said one index with the said mechanism when said reciprocating member has returned to initial position.

3. The combination of a reciprocating member adapted to be operated in conjunction with a scale, a first index for indicating the individual movements of said reciprocating member in one direction, a second index for indicating progressively and totalizing the said movements of the reciprocating member, mechanism for simultaneously operating the said two indexes, manually operated means for disconnecting the actuating elements in said mechanism for said second index to maintain it in indicating position and automatic means operated by the actuating elements in said mechanism for the first index for again connecting the said actuating elements for said second index with the said mechanism when said first index has returned to initial position.

4. The combination of a reciprocating member adapted to be operated in conjunction with a scale, a first index, a train of gears for operating said first index to indicate the movements of said reciprocating member, a second index, a second train of gears for operating the latter to totalize the movements of said reciprocating member, a clutch in said second train of gears, means for operating said clutch to disconnect said second index from its train of operating gears when said reciprocating member has moved in one direction and automatic means actuated by said first train of gears for operating the said clutch to connect said second index with its train of operating gears when said reciprocating member has moved in the opposite direction.

In testimony whereof, I have signed my name to this specification, this 19th day of February, 1919.

HENRY M. ROSENDAL DAM.